United States Patent [19]
Metcalf

[11] 3,911,359
[45] Oct. 7, 1975

[54] TRUE RMS CONVERTERS
[75] Inventor: Eric Metcalf, Ropley, England
[73] Assignee: The Solartron Electronic Group Limited, Hampshire, England
[22] Filed: June 13, 1974
[21] Appl. No.: 478,987

[30] Foreign Application Priority Data
June 29, 1973 United Kingdom............... 31026/73

[52] U.S. Cl. .................. 324/106; 324/95; 324/132; 328/144
[51] Int. Cl.² .................. G01R 19/24; G01R 15/10
[58] Field of Search ....... 324/106, 95, 132; 321/1.5; 328/144

[56] References Cited
UNITED STATES PATENTS
3,435,319  3/1969  Richman............................ 324/106

Primary Examiner—Alfred E. Smith
Assistant Examiner—Ernest F. Karlsen
Attorney, Agent, or Firm—William R. Sherman; Stewart F. Moore; Kevin McMahon

[57] ABSTRACT

An RMS converter of the type wherein the energy of the input signal is dissipated in a first resistor and a second signal, in a form which lends itself to measurement, is generated which dissipates an equal amount of heat in a second resistor, the second signal being derived from measurement of temperature differential between the first and second resistors.

This converter is characterised by a circuit for applying power to both resistors so that the total power received by each resistor remains substantially constant.

6 Claims, 2 Drawing Figures

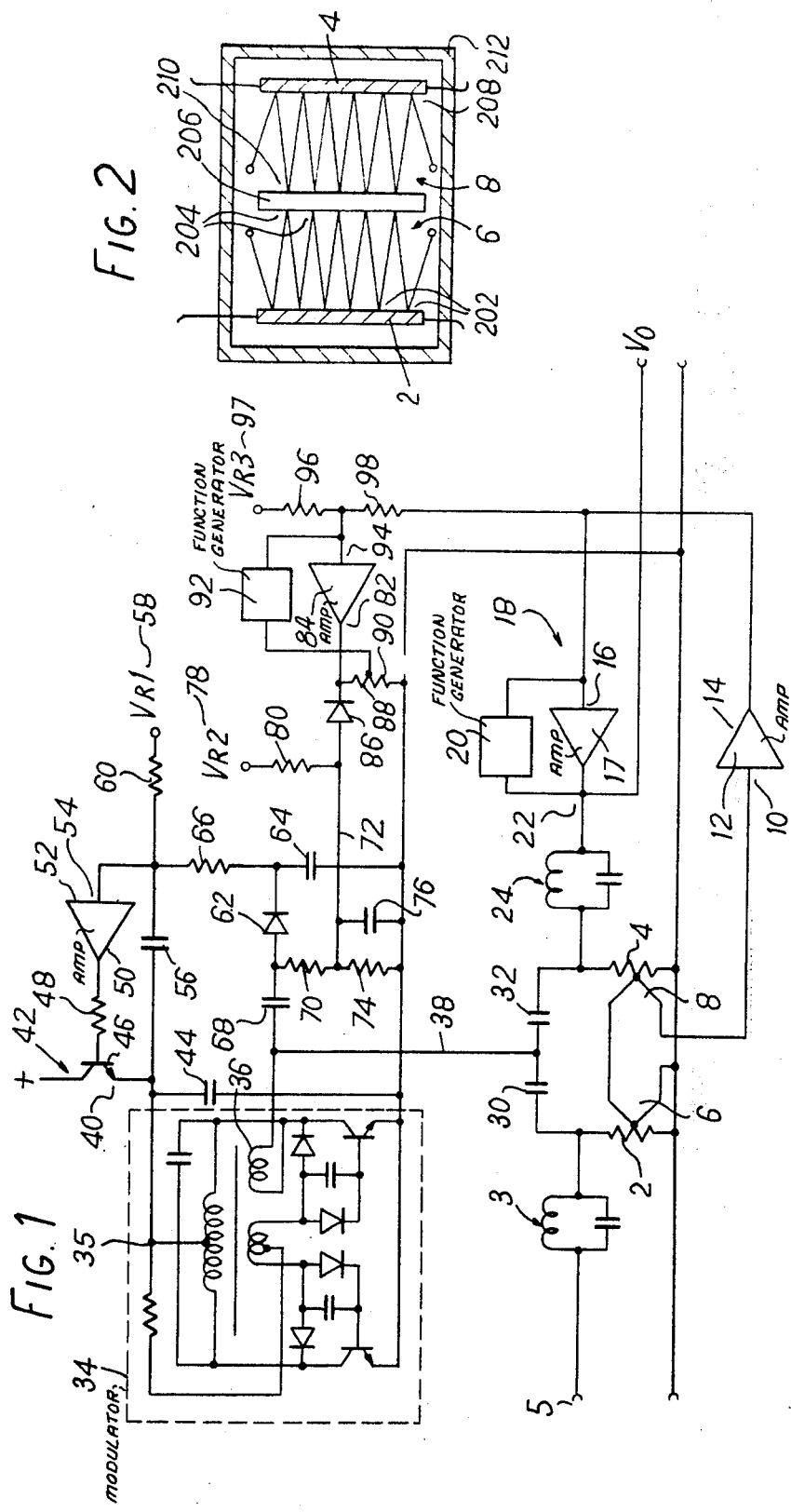

TRUE RMS CONVERTERS

This invention relates to devices for measuring the RMS (root mean square) amplitude of an electrical signal that is to say the parameter defined by the expression $$\sqrt{\left(\frac{1}{T}\int_o^T X^2(t)\,dt\right)},$$

$T$ being the period over which the electrical signal is integrated and $x(t)$ describing the instantaneous value of the signal with respect to time. Such a parameter, which describes the total energy content of a signal, may be used to characterise the signals of complex, random or unknown wave forms.

In a simple system the signal to be measured is applied to one resistor heating element and a DC signal is applied to a second element, matched to the first; the value of the DC signal is adjusted until both resistors are at the same temperature, so that the DC signal serves as a measure of the RMS value of the other signal. The adjustment may conveniently be made automatically by means of a feedback loop receiving a signal from a sensor responsive to a difference in temperature between the two resistor heating elements.

Such a system has a slow response and it is in practice very difficult to match the heating elements and thermocouples throughout their operating temperature range. These difficulties are alleviated in another design in which the signal is applied to one resistor heater of a double heater thermocouple, the output voltage of which is compared with a reference voltage by a differential amplifier. The difference voltage produced by this amplifier is supplied to the other resistor heater of the thermocouple so as to maintain its output voltage equal to the reference voltage. The same difference voltage is also applied to one resistor of another identical double heater thermocouple, the output voltage of which is compared with the reference voltage by a second differential amplifier. The difference voltage produced by this amplifier is supplied to the other resistor heater of the second thermocouple so as to maintain its output voltage equal to the reference voltage. Under these conditions the output voltage of the second differential amplifier is representative of the RMS value of the input signal.

The second design whilst avoiding some of the difficulties of the first suffers from the practical disadvantage that each of the two thermocouples has two heating elements and the accuracy of measurement requires not only that the four heating elements by physically identical, but also that thermal coupling between the heating elements and their respective junctions be exactly the same. The practical difficulties of manufacturing devices meeting these requirements increases the cost of the device considerably and the accuracy of existing converters which uses the technique is generally not better than 1%. It is an object of the present invention to palliate this disadvantage.

According to this invention there is provided a device for use in measuring the RMS value of an input signal comprising first and second substantially identical heating elements, means for applying to the first heating element a signal representative of the input signal, means for sensing a temperature differential between the first and second heating elements and for providing a signal representative thereof, a feedback circuit, responsive to the signal representative of temperature differential for applying power to the second heating element so as to reduce the temperature differential, a source of reference signal, a source of power responsive to the reference signal and to a signal from the feedback circuit for applying to the first and second heating elements respectively substantially the same power, the level of which is adjusted in response to the signal from the feedback circuit so as to maintain substantially constant the total power received by the second heating element from the feedback circuit and from the source of power, wherein a signal from the feedback circuit representative of the amplitude of the signal applied to the second heating element to reduce the temperature differential serves as an output representative of the RMS value of the input signal.

Preferably the means for sensing temperature differential between the first and second heating elements comprises first and second substantially identical thermocouples in thermal contact with the respective first and second heating elements and advantageously the feedback circuit comprises a function generator circuit receiving a signal representative of temperature differential and providing an output proportional to the square root thereof. The heating signal provided by the source of power to the first and second heating elements may with advantage be alternating current and in such case the source of power preferably comprises a modulator receiving at least one DC signal and providing an output representative thereof which is alternating current.

The invention will now be described by way of non-limitative example only by reference to the attached drawing in which:

FIG. 1 is a schematic diagram of a converter according to the invention.

FIG. 2 depicts a twin thermocouple assembly for use in the invention.

In FIG. 1 there are shown first and second substantially identical heating elements, 2 and 4 respectively, which are in close thermal contact with respective first and second thermocouples 6 and 8. Heating element 2 is connected to receive an input signal 5 via a parallel tuned filter 3.

Thermocouples 6 and 8 are connected in opposition to one another so as to provide a signal representative of temperature differential between respective heating elements 2 and 4; this signal is applied to the input 10 of amplifier 12.

The output 14 of amplifier 12 is connected to the input 16 of function generator 18 which comprises a function generating network 20 connected between the output 22 and the input 16 of an amplifier 17 such that the signal appearing at output 22 is proportional to the square root of the signal appearing at its input 16. The output 22 is connected via a parallel tuned filter 24 to the second heating element 4 and the signal $V_o$ at output 22 also serves as an output from the converter representative of the RMS value of the input signal 5.

Amplifiers 12 and 17 act as a feedback circuit, supplying power to heating element 4 if a signal at input 10 indicates that the temperature of element 4 is less than that of element 2, so as to reduce the temperature differential.

Heating elements 2 and 4 are also connected via respective capacitors 30 and 32 to receive power from a modulator 34 which operates at a frequency above that of the highest components of the input signal.

Modulator 34, which is a known push pull design, is coupled by means of a low impedance winding 36 to the common point 38 of capacitors 30 and 32.

Modulator 34 receives power at point 35 from the emitter 40 of emitter follower 42; point 35 is decoupled to ground by capacitor 44. The base 46 of emitter follower 42 is connected via resistor 48 to the output 50 of amplifier 52 which has an input 54.

The input 54 is connected to emitter 40 by capacitor 56, to a first reference potential $V_R1$ 58 via resistor 60 and to the junction of diode 62 and capacitor 64 via resistor 66. The other plate of capacitor 64 is grounded and the other electrode of diode 62 is connected via capacitor 68 to common point 38.

The junction of capacitor 68 and diode 62 is connected via resistor 70 to common point 72 which is connected to ground via resistor 74 and parallel capacitor 76, to a second reference potential $V_R2$ at 78 via resistor 80 and to the output 82 of amplifier 84 via a diode 86. The output 82 is also connected to ground via series resistors 88 and 90, the common point of which is connected via function generator network 92 to the input 94 of amplifier 84, the characteristics of network 92 being such that the signal at output 82 is proportional to the square root of the signal at input 94.

The input 84 is connected via resistor 96 to a third reference potential $V_R3$ 97 and via resistor 98 to the output 14 of amplifier 12. It will be appreciated that modulator 34 serves as a source of power coupled via winding 36 and capacitors 30 and 32 to the heating elements 30 and 32 and that the level of power supplied by modulator 34 depends upon the signals from the reference sources $V_R1$ $V_R2$ and $V_R3$ and on the signal from output 14 in the feedback circuit which is applied to the input 94 via resistor 98.

The diode 62 serves to rectify part of the output of modulator 34 which is also fed back to stabilise the operating level of modulator 34 in the absence of a feedback signal at output 14.

The twin heater thermocouple assembly may advantageously be constructed as shown in FIG. 2. The thermocouple 6 has a set of hot junctions 202 and a set of cold junctions 204. The hot junctions are in thermal contact with the heating element 2 whilst the cold junctions are in thermal contact with a pillar 206 forming part of a heat sink. The second thermocouple 8 has a set of hot junctions 208 and a set of cold junctions 210 identical to those of the first thermocouple assembly. The hot junctions 208 are in contact with heating element 4 whilst the cold junctions 210 are in contact with the pillar 206.

This assembly is contained in a case 212 forming an isothermal chamber; in this way it is possible to obtain two multijunction thermocouples which in operation are substantially identical, being not only physically identical but at the same ambient temperature.

In operation when power is first supplied to the converter, and in the absence of any input signal to be measured, the modulator 34 supplies power equally to the elements 2 and 4. The level of power is determined by reference potentials $V_R1$ 58, $V_R2$ 78, and $V_R3$ 97, and the operating temperature reached by the heating elements 2 and 4 and the respective thermocouples 6 and 8 which are in thermal contact therewith will be determined by this power level.

Application of an input signal 5 via filter 3 to heating element 2 has the effect of heating the element and so unbalancing the outputs of respective thermocouples 6 and 8; the resulting signal at the input 10 of amplifier 12 causes power from the output 22 of function generator 18 to be applied to element 4 to restore the temperature balance between respective elements 2 and 4.

If the power supplied by modulator 34 to the heating elements 2 and 4 remained constant the temperature of both heating elements would rise by the amount required to dissipate the additional powers applied respectively by the input signal and the feedback signal.

Accordingly the design provides that elements 2 and 4 are operated at substantially constant temperature by supplying each with constant power irrespective of the magnitude of the input signal. This allows the thermocouples 6 and 8 which are in thermal contact with the respective heating elements 2 and 4, to operate near a fixed point on their characteristics and avoid the need to track accurately throughout an extended range.

Operation at constant temperature also has the advantage of improving the settling time of the instrument by bringing within the feedback loop the effects of thermal inertia and thermal resistances between respective heating elements and thermocouples.

Operation at constant power is achieved according to the invention by reducing the power supplied to elements 2 and 4 by modulator 34 by substantially the same amount as the power supplied by the input signals and feedback signals respectively. The feedback signal $Vo^2$ at the output 14 of amplifier 12 is applied with reference signal $V_R3$ 97 to the input of amplifier 84 Non-linear feedback via function network 92 forms an output proportional to $\sqrt{(K - Vo^2)}$ at output 82 where K represents the power supplied by modulator 34 to each heating element in the absence of input signal. It follows that the power supplied to each heating element will be proportional to $(K - Vo^2)$. As the power supplied to each heating element 2 and 4 by the input signal and feedback signal respectively is proportional to $Vo^2$ the total power received by each element remains substantially constant.

It will be appreciated that since each heating element is to receive power from two separate sources of power, that is to say from the modulator and from either the input signal or from the feedback signal, it is necessary that one of the two signals received by each heating element should be AC. If DC signals were added the sum of the two voltages would produce a greater power dissipation than the sum of the power dissipations produced by each voltage individually, whereas a DC voltage and an AC voltage, or two AC voltages, applied to the same heating element will produce a power equal to the sum of the voltages applied independently.

In this design a DC signal is used in the feedback loop and serves as an output signal, allowing the frequency response of the system in respect of measurements on an input signal to be extended down to DC; this requires that the power supplied by the power source, the modulator 34, must be AC.

It will be appreciated that the invention lends itself to many different embodiments.

For example the means for sensing the temperature of and the differential between the first and second heating elements might conveniently be passive components, such as diodes or thermistors, as well as active components such as the thermocouples in the embodiment of FIG. 1.

Similarly, provided that the signal in the feedback circuit and the input signal itself are both AC, the power supplied to the heating elements 2 and 4 from the common source of power which is adjusted in response to the level of the input and feedback signals, may be DC. Alternatively all signals received by the heating elements may be AC.

I claim:

1. A device for use in measuring the root mean square value of an input signal, comprising first and second substantially identical heating elements, means for applying to the first heating element a signal representative of the input signal, means for sensing a temperature differential between the first and second heating elements and for providing a signal representative thereof, a feedback circuit connected to receive the signal representative of temperature differential and to apply a feedback signal to the second heating element so as to reduce the said temperature differential, a source of reference signal, and an adjustable A.C. power source responsive to the reference signal and a signal from the feedback circuit to deliver to each of the first and second heating elements an amount of power dependent of the difference between the reference signal and said signal from the feedback circuit, said power source being arranged to deliver substantially the same amount of power to each of the said heating elements, whereby the total power received by each heating element remains substantially constant and the feedback signal is representative of the RMS value of the input signal.

2. A device according to claim 1, wherein the means for sensing temperature differential between the first and second heating elements comprises respective first and second substantially identical thermocouples in thermal contact with the respective first and second heating elements.

3. A circuit according to claim 1, wherein the feedback circuit comprises an amplifier connected to receive and amplify said signal representative of temperature differential and a function generator circuit arranged to receive the amplified signal and to produce an output, the amplitude whereof is linearly related to the square root of the amplitude of the said amplified signal, said output constituting said feedback signal.

4. A device according to claim 1, wherein the adjustable A.C. power source comprises a modulator connected to receive at least one DC signal and providing an output representative thereof which is alternating current.

5. A device for use in measuring the root mean square value of an input signal comprising first and second substantially identical heating elements, means for applying to the first heating element a signal representative of the input signal, means for sensing a temperature differential between the first and second heating elements and for providing a signal representative thereof, a feedback circuit connected to receive the signal representative of temperature differential and to apply a feedback signal having an amplitude proportional to the square root of the amplitude of the signal representative of temperature differential to the second heating element so as to reduce the said temperature differential, a source of reference signal, a level control circuit having an input and an output and receiving at its input the signal representative of temperature differential and the reference signal and producing at its output a control signal representative of the square root of the difference between the signals at its input, an adjustable A.C. power source connected to receive the control signal and connected to the first and second heating elements respectively for delivering substantially the same power to each of the said heating elements, said source being adapted to adjust the power in response to the control signal so that the total power received by the second heating element from the feedback signal and from the power source remains substantially constant, whereby a signal from the feedback circuit representative of the feedback signal applied to the second heating element to reduce the temperature differential serves as an output representative of the RMS value of the input signal.

6. A device according to claim 3, comprising means for applying said amplified signal to said power source as said signal from the feedback circuit.

* * * * *